(12) United States Patent
Sandstrom

(10) Patent No.: US 8,501,859 B2
(45) Date of Patent: Aug. 6, 2013

(54) RUBBER CONTAINING HYDROPHILIC SORBITAN MONOSTEARATE AND TACKIFYING RESIN AND TIRE WITH SIDEWALL THEREOF

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 488 days.

(21) Appl. No.: 11/890,390

(22) Filed: Aug. 6, 2007

(65) Prior Publication Data

US 2009/0043039 A1 Feb. 12, 2009

(51) Int. Cl.
*C08K 5/15* (2006.01)
*C08K 5/1535* (2006.01)
*C08K 3/04* (2006.01)
*B60C 1/00* (2006.01)

(52) U.S. Cl.
USPC .................................. 524/495; 524/111

(58) Field of Classification Search
USPC ............................. 524/495, 111
See application file for complete search history.

(56) References Cited

U.S. PATENT DOCUMENTS

| | | | |
|---|---|---|---|
| 2003/0201049 A1 * | 10/2003 | Sandstrom | 152/525 |
| 2003/0205309 A1 | 11/2003 | Sandstrom | 152/525 |
| 2006/0199924 A1 | 9/2006 | Banach et al. | 525/502 |

* cited by examiner

*Primary Examiner* — Angela C Scott
(74) *Attorney, Agent, or Firm* — Henry C. Young, Jr.

(57) ABSTRACT

A carbon black reinforced rubber composition which contains hydrophilic sorbitan monostearate and specialized tackifying resin and a pneumatic rubber tire having a visually observable rubber component, such as for example a rubber sidewall, of said rubber composition. The surface of said rubber composition, namely the tire sidewall rubber component, in its uncured state contains said hydrophilic sorbitan monostearate on its surface together with said specialized tackifying resin to promote enhanced building tack and thereby counteract building tack loss by the sorbitan monostearate having been exposed to moisture (moisture exposed surface) during the processing of the rubber composition, particularly after its high shear processing such as, for example, extrusion.

1 Claim, No Drawings

RUBBER CONTAINING HYDROPHILIC SORBITAN MONOSTEARATE AND TACKIFYING RESIN AND TIRE WITH SIDEWALL THEREOF

FIELD OF THE INVENTION

A carbon black reinforced rubber composition which contains hydrophilic sorbitan monostearate and specialized tackifying resin and a pneumatic rubber tire having a visually observable rubber component, such as for example a rubber sidewall, of said rubber composition. The surface of said rubber composition, namely the tire sidewall rubber component, in its uncured state contains said hydrophilic sorbitan monostearate on its surface together with said specialized tackifying resin to promote enhanced building tack and thereby counteract building tack loss by the sorbitan monostearate having been exposed to moisture (moisture exposed surface) during the processing of the rubber composition, particularly after its high shear processing such as, for example, extrusion.

BACKGROUND OF THE INVENTION

Sorbitan monostearate may sometimes be used in a carbon black reinforced tire sidewall rubber composition to enhance its surface appearance by migration of the sorbitan monostearate from within the rubber sidewall rubber composition to create a relatively glossy protective film on the visual surface of the tire cured rubber sidewall.

However, sorbitan monostearate is hydrophilic in nature and attracts water to thereby typically significantly reduce surface building tack of the uncured sidewall rubber component, particularly in a humid atmosphere or as a direct application of cooling water onto an uncured sidewall rubber component in a tire manufacturing procedure. Such humid atmosphere, or application of cooling water, is usually applied to the uncured rubber component immediately after it is formed by, for example, a rubber extrusion process.

It is an aspect of this invention to use sorbitan monostearate in a tire sidewall component in combination with a specialized tackifying agent to substantially maintain surface building tack of the tire sidewall rubber component in the presence of moisture-containing hydrophilic sorbitan monostearate film on the surface of the uncured rubber component.

For the cured rubber sidewall component, the rubber sidewall may tend to become brown in color as a result of migration of antidegradants to the surface of the rubber composition, together with exposure to atmospheric ozone, ultraviolet light and weathering in general and the presence of the sorbitan monostearate film on the cured sidewall rubber surface tends to mask the presence of various antidegradants and tend to mitigate the effects of exposure to such atmospheric conditions to thereby enhance the appearance of the tire sidewall surface. Such phenomena are well known to those having skill in such art. For example, see U.S. Application Publication No. 2003/0205309.

It is to be appreciated that this invention is intended to go beyond a simple reduction or substantial elimination of a surface effect of one or more offending ingredients and exposure of the sidewall to atmospheric conditions.

Indeed, an important aspect of this invention is an inclusion of the sorbitan monostearate and its accompanying slow migration to the cured sidewall rubber surface in combination with a specialized tackifying resin to substantially retain building tack for the uncured rubber sidewall surface in the presence of moisture.

In the description of this invention, the term "phr" where used relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated.

The term "building tack", or "surface building tack" of the surface of an uncured rubber composition relates to surface tack present on the surface of the uncured rubber tire component which promotes adhesion between uncured rubber components when they are combined in the building of an uncured rubber tire. In this manner, the assembled uncured tire rubber components remain together prior to the curing of the tire assembly of rubber components. Such building tack and its use is well known to those having skill in such art.

DISCLOSURE AND PRACTICE OF THE INVENTION

In accordance with this invention, an uncured rubber composition is provided which comprises, based on 100 parts by weight rubber (phr);

(A) at least one (100 phr) diene-based elastomer, (B) from about 20 to about 120, alternately about 45 to about 90, phr of particulate rubber reinforcement comprised of:
  (1) rubber reinforcing carbon black, or
  (2) a combination of rubber reinforcing carbon black and amorphous silica (e.g. precipitated silica) comprised of:
    (a) about 10 to about 80, alternately from about 30 to about 60, phr of rubber reinforcing carbon black, and
    (b) about 10 to about 50, alternately from about 15 to about 30, phr of amorphous silica (e.g. precipitated silica);

wherein said rubber composition contains a dispersion of:

(C) about 0.5 to about 20, alternately about 1 to about 10, phr of sorbitan monostearate, and (D) greater than 2 phr, alternately between 2 and about 10 phr, alternately about 3 to about 5 phr, further alternately between 2 and about 4 phr, of a specialized tackifying resin (to promote moisture-aged surface building tack for the uncured rubber composition);

wherein said specialized tackifying resin is a vinyl monomer modified alkylphenol/formaldehyde resin comprised of a reaction product of an alkylphenol/formaldehyde resin and a vinyl monomer, and wherein at least one surface of said rubber composition contains a combination of said sorbitan monostearate and specialized tackifying resin.

In practice, said silica is typically used in combination with a silica coupler for said silica having a moiety reactive with hydroxyl groups (e.g. silanol groups) on said silica and another different moiety interactive with said diene-based elastomer(s).

In one aspect of the invention, said particulate rubber reinforcement is rubber reinforcing carbon black.

In another aspect of the invention, said particulate rubber reinforcement is comprised of a combination of rubber reinforcing carbon black and amorphous silica, particularly precipitated silica.

Exemplary of vinyl monomer modified alkylphenol/formaldehyde resins for use as rubber tackifiers may be found, for example, in U.S. Application Publication No. 2006/0199924, a reference which is incorporated herein in its entirety. However, there is no teaching or suggestion therein to use such tackifying resins in combination with sorbitan monostearate for a moisture-exposed rubber composition.

Representative of various alkylphenol/formaldehyde rubber tackifying resins without vinyl monomer modification are, for example, resins in which the alkylphenol is, for example comprised of tertiary octylphenol or tertiary butylphenol, such as, for example, a product of formaldehyde and such alkylphenol. It is believed that the tertiary octylphenol is the most common alkylphenol for such alkylphenol/formaldehyde rubber tackifying resins.

Representative of various vinyl monomers indicated in the aforesaid U.S. Application Publication No. 2006/0199924 for vinyl monomer modified alkylphenol/formaldehyde resins are, for example, compounds having the vinyl grouping ($CH_2$=CR—) representative of which are mentioned in its paragraph [0021]. Preferred vinyl monomers are indicated therein as being selected from the group consisting of styrene, alpha-methylstyrene, chlorostyrene, N,N-dimethylaminostyrene, aminostyrene, hydroxystyrene, t-butylstyrene, carboxystyrene, divinylbenzene, vinylnaphthalene and mixtures thereof. Exemplified are alpha-methyl styrene in paragraph [0031] and, Table 2 of Example 2; styrene, alpha-methyl styrene (AMS) and vinyl pyridine.

In practice, said specialized tackifying resin may have, for example herein only, a softening point in a range of from about 90° C. to about 150° C.

In practice, the specialized tackifying resin for use in this invention is referred to herein as a vinyl monomer modified alkylphenol/formaldehyde resin wherein such modification is, for example, by acid catalysis as indicated in said U.S. Application Publication No. 2006/0199924.

Representative of such specialized tackifying resins (vinyl monomer modified alkylphenol/formaldehyde resins) may, for example, be Elaztobond™ T3100, Elaztobond™, T6000 and Elaztobond™ T8000, respectively, from the SI Group company (formerly Schenectady International, Inc).

Such specialized tackifier resins themselves are not intended to include general rubber tackifier phenolic resins (although such general rubber tackifier resins may be included together with said specialized tackifier resin in the rubber composition, if desired) which have not been modified with a vinyl monomer. Such more general rubber tackifying resins are comprised primarily of a reaction product of formaldehyde and an alklphenol comprised of at least one of such as para-tertiary octylphenol and para-tertiary butylphenol, preferably para-tertiary octylphenol representative of which is, for example, SP-1068™ from said SI Group company (formally Schenectady).

The SP-1068 resin is considered herein to be a typical, or general, tackifying resin as an unreactive alkylphenol/formaldehyde resin (para-tertiary octyl phenol/formaldehyde resin formed as a reaction product of para-tertiary octylphenol and formaldehyde).

In additional accordance with this invention the said uncured rubber composition is provided wherein at least one surface thereof which contains said sorbitan monostearate and said specialized tackifying resin is exposed to moisture.

In further accordance with this invention a sulfur cured rubber composition is provided by sulfur curing said uncured rubber composition which contains said moisture exposed sorbitan monostearate and said specialized tackifying resin on its surface.

In additional accordance with this invention, said uncured tire rubber component, for example a sidewall rubber component, is provided wherein at least one surface thereof which contains said sorbitan monostearate and specialized tackifying resin is exposed to moisture and is therefore a moisture-exposed surface (surface exposed to moisture).

In further accordance with this invention, an uncured rubber component for an uncured rubber tire component, such as for example a tire rubber sidewall component, is comprised of said uncured rubber composition having a surface containing a combination of said sorbitan monostearate and said specialized tackifying resin.

In additional accordance with this invention, said uncured tire rubber component, for example a sidewall rubber component, is provided wherein at least one surface thereof which contains said sorbitan monostearate and specialized tackifying resin is exposed to moisture and is therefore a moisture-exposed surface (surface exposed to moisture).

In additional accordance with this invention, a sulfur cured rubber component, for example a sidewall rubber component is provided by sulfur curing said uncured rubber component which contains said moisture exposed sorbitan monostearate and said specialized tackifying resin on its surface.

In particular and in further accordance with this invention, said uncured tire rubber component, such as for example a tire rubber sidewall component surface is (has been) exposed to moisture during the formative processing thereof in its uncured state, (e.g. by a high shear, internal heat generating rubber extrusion process to thereby provide a shaped uncured rubber sidewall component at an elevated temperature which needs to be immediately cooled) and its moisture-exposed surface is dried, wherein a portion of the moisture is retained by said sorbitan monostearate on the surface of said uncured rubber component.

In additional accordance with this invention, an assembly of uncured rubber tire components is provided which contains said uncured rubber component, for example said tire sidewall rubber component, wherein said moisture-exposed uncured rubber component (e.g. sidewall rubber component) has a surface with suitable building tack for building said uncured rubber component, for example the tire sidewall rubber component, into an assembly of uncured rubber tire components.

In further accordance with this invention, a cured rubber tire is provided by curing the said assembly which contains said component, for example said sidewall component, in a suitable mold to form a cured rubber tire.

In additional accordance with this invention, such cured rubber tire (e.g. pneumatic rubber tire) is provided with said tire component, for example said tire sidewall component, having a visually observable outer surface comprised of said rubber composition which contains said sorbitan monostearate and specialized resin on its visible outer surface.

A significant aspect of the invention is the ability to provide building tack of the surface of an uncured rubber component (e.g. tire sidewall component) which contains a film of sorbitan monostearate on its surface during high humidity conditions or when the uncured rubber component is being exposed to moisture (water), including high humidity conditions, particularly during the preparation of said rubber component by processing said rubber composition.

This is considered herein to be significant in a sense of being able to promote, or provide, surface building tack for the uncured rubber component during the building of the rubber component into an assembly of tire rubber components prior to the curing step for the tire assembly.

In further accordance with this invention, said tire contains a film of said sorbitan monostearate on an outer, visible surface of the tire component, for example a tire sidewall, together with said specialized resin.

In particular accordance with this invention said tire contains a film of said sorbitan monostearate on an outer, visible surface of said tire component formed by its migration within the uncured rubber component in the presence of said specialized resin which also migrates within the uncured rubber component to the outer, visible, rubber surface of the rubber component and, ultimately, as film on the outer visible surface of the tire.

In practice, said tire contains a film of said sorbitan monostearate on an outer, visible surface of said tire component, for example its sidewall, as a result of said sorbitan monostearate migration from a dispersion thereof within the rubber composition of said tire sidewall to the outer, visible, rubber surface of said tire sidewall in a manner, as hereinbefore pointed out, to mask an appearance of antidegradants which may have migrated to the surface of the rubber composition, together with exposure to atmospheric ozone, ultraviolet light and weathering in general thereby enhance the appearance of the tire sidewall surface.

In one aspect of this invention, the particulate reinforcement for carbon black rich rubber composition, and the aforesaid tire component, for example the sidewall component, is rubber reinforcing carbon black, preferably to the exclusion of any appreciable amount of silica (e.g. less than 5 phr of silica) and without (preferably to an exclusion of) silane based materials (e.g. alkyl silanes, alkoxy silanes, and silica couplers such as, for example, alkoxyorganosilane polysulfides and alkoxyorganomercaptosilanes).

In another aspect of the invention, the carbon black-containing rubber composition of this invention, and the aforesaid tire component, for example the sidewall component, may also contain silica (e.g. precipitated silica) reinforcement, typically in combination with a silica coupling agent to aid in coupling the silica to the elastomer(s), namely conjugated diene-based elastomers, contained in the rubber composition.

While the mechanism may not be entirely understood, it is believed that the sorbitan monostearate migrates to the visual surface of the tire rubber component (e.g. sidewall component) in the presence of the specialized tackifying resin to form a substantially continuous film of relatively consistent molecular weight on the sidewall surface to provide the cured sidewall surface with a somewhat glossy, aesthetically appealing, appearance, particularly for a black colored tire sidewall where the black color is a result of the carbon black contained in the sidewall rubber composition.

For the purposes of this description, the "rubber composition" and "compounded" rubber compositions refer to the respective rubber compositions which have been compounded with appropriate compounding ingredients such as, for example, carbon black, oil, stearic acid, zinc oxide, wax, antidegradants, resin(s), sulfur and accelerator(s) as well as the aforesaid sorbitan monostearate and specialized phenolic tackifying resin.

In the practice of this invention, the rubber composition of said tire sidewall may be comprised of at least one diene-based elastomer selected from, for example, polymers and copolymers of at least one of isoprene and 1,3-butadiene and copolymers of styrene and/or alpha methylstyrene with at least one of isoprene and 1,3-butadiene and may include an EPDM rubber (ethylene/propylene/conjugated diene rubber terpolymer).

The elastomers for the tire sidewall rubber composition may be selected from, for example, one or more of diene-based cis 1,4-polyisoprene rubber (natural or synthetic), cis 1,4-polybutadiene rubber, styrene/butadiene copolymer rubbers (whether prepared by solvent solution or aqueous emulsion polymerization, styrene/isoprene/butadiene terpolymer rubbers, isoprene/butadiene copolymer rubber, high vinyl polybutadiene rubber having a vinyl 1,2-content in a range of from about 30 to about 90 percent, trans 1,4-polybutadiene rubber and 3,4-polyisoprene rubber. Preferably it is comprised of a combination of natural rubber together with cis 1,4-polybutadiene rubber.

Typical amounts of processing aids, if used, may, for example, comprise 1 to 50 phr. Such processing aids may include, for example, aromatic, napthenic, and/or paraffinic processing oils. Typical amounts of antioxidants may comprise, for example, about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes, if used, may comprise, for example, about 1 to about 5 phr. Often microcrystalline waxes are used. Typical amounts of peptizers, if used, may comprise, for example, about 0.1 to about 1 phr. Typical peptizers may be, for example, pentachlorothiophenol and dibenzamidodiphenyl disulfide. The presence and relative amounts of the above additives are considered to be not an aspect of the present invention.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may be used, for example, in an amount ranging from about 0.5 to about 4 phr, with a range of from about 0.5 to about 2.25 sometimes being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators in which the primary accelerator is generally used in the larger amounts, 0.5 to 2 phr, and a secondary accelerator which is generally used in amounts of 0.05 to 0.50 phr in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Various types of accelerators are, for example, various amines, disulfides, guanidines, thioureas, thiazoles, thiurams, sulfenamides, dithiocarbamates and xanthates. It is usually preferred that the primary accelerator is a sulfenamide. If a second accelerator is used, the secondary accelerator may preferably be a guanidine, dithiocarbamate or thiuram compound. The presence and relative amounts of sulfur vulcanizing agent and accelerator(s) are not considered to be an aspect of this invention.

Sometimes a combination of antioxidants, antiozonants may be collectively referred to as antidegradants.

The tire can be built, shaped, molded and cured by various methods which will be readily apparent to those having skill in such art.

The prepared tire of this invention is conventionally shaped and cured by methods known to those having skill in such art.

The invention may be better understood by reference to the following Examples in which the parts and percentages are by weight unless otherwise indicated.

EXAMPLE I

Comparative Rubber Samples A and B were prepared to evaluate an effect of using a combination of sorbitan monostearate and conventional alkylphenol/formaldehyde tackifying resin in a rubber composition for a tire sidewall component in the sense of measuring surface building tack for the rubber composition before and after moisture ageing and, also, observing the appearance of the surface of the rubber composition after curing the rubber composition.

Rubber Sample A was a comparative Control Rubber Sample which did not contain the sorbitan monostearate but did contain a conventional alkylphenol/formaldehyde tackifying resin identified as tackifying resin X.

Rubber Sample B was a comparative Control Rubber Sample which contained sorbitan monostearate which was allowed to migrate within the rubber composition to form a film on its surface and further contained a conventional alkylphenol/formaldehyde tackifying resin identified as tackifying resin X.

Experimental Rubber Samples C, D and E were prepared to evaluate using a combination of sorbitan monostearate and alternative tackifying resins in the rubber composition, all of which were allowed to migrate to the surface of the respective rubber Samples to form a film thereof on their surfaces, namely:

1. a petroleum based tackifying resin (rubber tackifying resin) for rubber Sample C identified as tackifying resin Y;

2. a conventional alkylphenol/formaldehyde tackifying resin (rubber tackifying resin) for rubber Sample D identified as tackifying resin Z.

3. a vinyl monomer modified alkylphenol/formaldehyde resin (rubber tackifying resin) for rubber Sample E identified as tackifying resin Q.

The basic formulation for the rubber Samples is exemplified in the following Table 1 in which the parts are by weight unless otherwise indicated.

For the preparation of the Rubber Samples, in the first, or non-productive internal mixing stage, the ingredients were mixed for about 4 minutes to a drop temperature of about 150° C. In the second or productive mixing stage, sulfur and accelerator(s) were added and mixed for about 2 minutes to a drop temperature of about 110° C.

TABLE 1

| Non-productive Mixing (4 min. at 150° C.) | |
| --- | --- |
| Natural rubber | 40 |
| Cis 1,4-polybutadiene[1] | 60 |
| Carbon black[2] | 51 |
| Antioxidants/antiozonants[3] | 4.5 |
| Processing oil[4] | 10 or 14 |
| Wax[5] | 0 or 1 |
| Sorbitan monostearate[6] | 0 or 2 |
| Tackifier X, Y, Z or Q[7] | 4 |

TABLE 1-continued

| Productive Mixing | |
| --- | --- |
| Zinc oxide | 3 |
| Sulfur and accelerators[8] | 2.5 |

[1]Obtained as BUD ® 1207 from The Goodyear Tire & Rubber Company
[2]N-550 rubber reinforcing carbon black, an ASTM designation.
[3]Blend of Santoflex ™ 6PPD from Flexsys and Wingstay ® 100 from The Goodyear Tire & Rubber Company
[4]Flexon ™ 641 from ExxonMobil
[5]Blend of microcrystalline and paraffinic waxes in about a 2/1 weight ratio m/p
[6]As Glycomul S ™ from the Lonza Chemical Company
[7]Tackifying resins (rubber tackifying resins)
[8]Sulfenamide and guanidine based sulfur cure accelerators The cure behavior and various cured physical properties for each composition are shown in Table 2. Where appropriate, the Samples were individually cured for 12 minutes at about 170° C.

The results of ozone testing, namely static and dynamic ozone testing, of the cured Samples are shown as well as measured original and moisture aged surface tack for the uncured rubber Samples. The general conditions for the ozone testing of the Samples, whether static or dynamic, in terms of ozone concentration, time and temperature, are indicated.

TABLE 2

| | Sample | | | | |
| --- | --- | --- | --- | --- | --- |
| | A | B | C | D | E |
| Sorbitan monostearate | 0 | 2 | 2 | 2 | 2 |
| Processing oil | 14 | 10 | 10 | 10 | 10 |
| Wax | 1 | 0 | 0 | 0 | 0 |
| Tackifier, (tackifying resin); (4 phr) | X[1] | X[1] | Y[2] | Z[3] | Q[4] |
| Rheometer, 150° C. | | | | | |
| Maximum torque, dNm | 11.2 | 10 | 11 | 10.2 | 10 |
| Minimum torque, dNm | 2.2 | 2.5 | 2.7 | 2.7 | 2.6 |
| Delta torque, dNm | 9 | 7.5 | 8.3 | 7.5 | 7.4 |
| T90, minutes | 14.9 | 15.2 | 14.7 | 16.1 | 16.2 |
| Stress-strain | | | | | |
| Tensile strength, MPa | 13.4 | 12.2 | 12.8 | 12.1 | 11.5 |
| Elongation at break % | 717 | 718 | 685 | 700 | 705 |
| 300% modulus | 4.1 | 3.5 | 4 | 3.6 | 3.5 |
| Rebound % | | | | | |
| 23° C. | 54 | 52 | 54 | 52 | 51 |
| 100° C. | 58 | 55 | 56 | 54 | 53 |
| Hardness, Shore A | | | | | |
| 23° C. | 50 | 48 | 49 | 49 | 48 |
| 100° C. | 45 | 44 | 45 | 44 | 44 |
| Tear Strength, N, 95° C. | 143 | 230 | 170 | 212 | 208 |
| Tack Strength, N, of uncured rubber Samples | | | | | |
| Original | 8.1 | 8.7 | 8.1 | 7.9 | 9.2 |
| Aged 3 days at 30° C. and 90% relative humidity (moisture aged) | 4.2 | 1.2 | 0.7 | 1.2 | 9 |
| Static Ozone Test Observations of Cured Rubber Samples, Ozone 50 pphm, 48 hours, 40° C., Variable Strain | | | | | |
| Number of cracks | B | 0 | 0 | 0 | 0 |
| Size of cracks | 3 | N/A | N/A | N/A | N/A |
| Appearance | dull brown | black | black | black | black |

TABLE 2-continued

|  | Sample | | | | |
| --- | --- | --- | --- | --- | --- |
|  | A | B | C | D | E |
| Dynamic Ozone Test Observations of Cured Rubber Samples Ozone 50 pphm, 48 hours, 40° C., 60% Strain | | | | | |
| Number of cracks | D | D | D | D | D |
| Size of cracks | 2 | 2 | 2 | 2 | 2 |

The following is the key used to report visual observations of the cracks, if any, on the surface of a respective Sample in the associated Tables:

| Number of Cracks | Size of Cracks |
| --- | --- |
| O = None | 1 = small (hairline) |
| A = less than ¼ surface | 2 = medium |
| B = ¼ to ½ surface | 3 = large |
| C = ½ to ¾ surface | 4 = severe (open) |
| D = ¾ to all surface | |

[1] Tackifier X, unreactive alkylphenol/formaldehyde resin (para-tertiary octyl phenol), as SP1068 from SI Group, a generally used, common, rubber tackifying resin
[2] Tackifier Y, mixture of straight chain, 5-carbon, petroleum hydrocarbon resin, as Escorez 1102 ™ from ExxonMobil
[3] Tackifier Z, unreactive alkylphenol/formaldehyde resin, as CRJ-418 ™ from Sovereign Chemical.
[4] Tackifier Q, vinyl monomer modified phenol/formaldehyde resin from SI Group as Elaztobond ™ T-3100, namely a specialized tackifying resin.

In Table 2 it can be seen that the original building tack for the surface of the uncured Samples containing the sorbitan monostearate (Samples B, C, D and E) are substantially equal to the uncured Control Sample and all of the included tackifying resins X, Y, Z and Q appeared to provide suitable building tack.

However, after high humidity "moisture" ageing for 3 days at about 30° C. and 90 percent relative humidity, the surfaces of Rubber Samples B, C and D had significantly lower uncured tack and were considered herein as being thereby undesirable aged tack values for use as rubber components for building passenger automobile tires.

In dramatic contrast, the surface of rubber Sample E, which contained a combination of sorbitan monostearate and specialized tackifying resin Q, exhibited a significantly higher uncured high humidity "moisture" aged tack, than rubber Sample A, as well as Rubber Samples B, C and D and is thereby considered herein as being a desirable value for use as a rubber component for building passenger automobile tires.

In particular, the inclusion of the specialized tackifying resin Q in the sorbitan monostearate-containing Rubber Sample E resulted in good building tack for the uncured Rubber Sample E after aged high humidity exposure which is a significant departure from the moisture-aged Rubber Samples B, C and D which exhibited significantly less surface building tack.

EXAMPLE II

Experimental Rubber Samples F through I were prepared to evaluate an effect of using a combination of sorbitan monostearate and various levels of the specialized tackifying resin Q to establish a desirable range of levels thereof, for a rubber composition for a tire sidewall component in the sense of observing surface building tack for the rubber composition before and after high humidity "moisture" ageing and, also, the appearance of the surface of the rubber composition after curing the rubber composition.

Rubber Samples F through I contained a dispersion of a combination of sorbitan monostearate and various levels, or amounts, of the specialized tackifying resin Q.

The basic formulation is exemplified in the following Table 3, using materials indicated in Table 1, in which the parts are by weight unless otherwise indicated.

The Rubber Samples were prepared in the manner of Example I.

TABLE 3

| Non-productive Mixing (4 min. at 150° C.) | |
| --- | --- |
| Natural rubber | 40 |
| Cis 1,4-polybutadiene | 60 |
| Carbon black | 51 |
| Antioxidants/antiozonants | 4.5 |
| Processing oil | 10, 12 |
| Sorbitan monostearate | 2 |
| Tackifier Q | 1 to 4 |
| Productive Mixing | |
| Zinc oxide | 3 |
| Sulfur and accelerators | 2.5 |

The cure behavior and various cured physical properties for the compositions are shown in Table 4 and are provided in the manner of Example I.

TABLE 4

|  | Sample | | | |
| --- | --- | --- | --- | --- |
|  | F | G | H | I |
| Sorbitan monostearate | 2 | 2 | 2 | 2 |
| Processing oil | 10 | 11 | 11.5 | 12 |
| Tackifier Q | 4 | 3 | 2 | 1 |
| Rheometer, 150° C. | | | | |
| Maximum torque, dNm | 10.9 | 11.2 | 11.6 | 11.9 |
| Minimum torque, dNm | 2.5 | 2.5 | 2.6 | 2.7 |
| Delta torque, dNm | 8.4 | 8.7 | 9 | 9.2 |
| T90, minutes | 14.3 | 14.7 | 14.7 | 14 |
| Stress-strain | | | | |
| Tensile strength, MPa | 12.8 | 12.5 | 13 | 13.3 |
| Elongation at break % | 701 | 688 | 683 | 683 |
| 300% Modulus | 4.1 | 4 | 4.2 | 4.3 |
| Rebound % | | | | |
| 23° C. | 53 | 54 | 54 | 54 |
| 100° C. | 56 | 56 | 56 | 56 |
| Hardness, Shore A | | | | |
| 23° C. | 50 | 50 | 51 | 52 |
| 100° C. | 45 | 45 | 47 | 41 |
| Tear Strength, N, 95° C. | 197 | 177 | 184 | 158 |
| Tack Strength, N of uncured rubber Samples | | | | |
| Original | 9.8 | 11.1 | 4.4 | 5.6 |
| Aged 3 days at 30° C. and 90% relative humidity (moisture aged) | 7.1 | 10.9 | 1.3 | 0.4 |
| Static ozone test observations of cured rubber Samples Ozone 50 pphm, 48 hours, 40° C., Variable Strain | | | | |
| Number of cracks | 0 | 0 | 0 | 0 |
| Size of cracks | N/A | N/A | N/A | N/A |

TABLE 4-continued

| | Sample | | | |
|---|---|---|---|---|
| | F | G | H | I |
| Appearance | black | black | black | black |
| Dynamic ozone test observations of cured rubber Samples Ozone 50 pphm, 48 hours, 40° C., 60% Strain | | | | |
| Number of cracks | D | D | D | D |
| Size of cracks | 3 | 3 | 3 | 3 |

It can be seen from Table 4 that significant moisture (high humidity) aged tack was observed for uncured rubber Samples G and F which contained levels of 3 and 4 phr, respectively, of the tackifier Q in combination with the hydrophilic sorbitan monostearate.

However, less than desirable moisture (high humidity) aged tack was observed for uncured rubber Samples I and H which contained levels of 1 and 2 phr, respectively, of the tackifier Q in combination with the hydropohilic sorbitan monostearate.

Accordingly, it is concluded herein that desirable levels of tackifier Q, in combination with the sorbitan monostearate, is an amount of greater than 2 phr, and more preferably at least about 3 phr where moisture aged tack for the uncured rubber Sample is a consideration when using sorbitan monostearate.

Accordingly, in practice, it is considered herein that the tackifier Q, based upon the results of this Example, may desirably be used, for example, in a range of between 2 (thereby greater than 2) to about 10 phr, alternatively between 2 and about 5, alternately between 2 and about 4 in combination with the sorbitan monostearate where moisture (e.g. high humidity) aged tack for the uncured rubber surface is desired.

It is considered herein that a greater amount than 4 phr (e.g. up to 5 phr or even up to 10 or more phr if warranted or desired and is appropriate) of the specialized tackifying resin may be used in combination with the sorbitan monostearate, however, an increased amount of the specialized tackifying resin may be simply excessive insofar as building tack results obtained and also simply increases the cost of the rubber composition itself.

While certain representative embodiments and details have been shown for the purpose of illustrating the invention, it will be apparent to those skilled in this art that various changes and modifications may be made therein without departing from the spirit or scope of the invention.

What is claimed is:

1. A tire sidewall component comprised of an uncured rubber composition having a building tack property, where said uncured rubber composition has a water treated surface containing a combination of sorbitan monostearate, wherein said sorbitan monostearate contains a portion of said water, together with a specialized tackifying agent which comprises, based on 100 parts by weight rubber (phr);
   (A) a combination of natural cis 1,4-polyisoprene rubber and cis 1,4-polybutadiene rubber,
   (B) from about 45 to about 90 phr of particulate rubber reinforcing carbon black;
   wherein said uncured rubber composition contains a dispersion comprised of:
   (C) about 1 to about 10 phr of water containing sorbitan monostearate, and
   (D) about 3 to about 5 phr of a specialized tackifying resin;
   wherein said specialized tackifying resin is a vinyl monomer modified alkylphenol/formaldehyde resin comprised of a reaction product of an alkylphenol/formaldehyde resin and a vinyl monomer;
   wherein said alkylphenol for said specialized tackifying resin is at least one of tertiary octylphenol and tertiary butyl phenol, and
   wherein said vinyl monomer for said specialized tackifying resin is selected from styrene and alpha-methylstyrene and their mixtures.

* * * * *